United States Patent [19]

Reed

[11] 4,289,932
[45] Sep. 15, 1981

[54] CONFERENCING COMMUNICATIONS SYSTEM

[76] Inventor: Roger R. Reed, 31 Hutchinson St., Arlington, Mass. 02174

[21] Appl. No.: 84,907

[22] Filed: Oct. 15, 1979

[51] Int. Cl.³ .............................................. H04M 3/56
[52] U.S. Cl. .............................. 179/18 BC; 179/1 CN; 370/62
[58] Field of Search ........................ 179/18 BC, 1 CN; 370/62

[56] References Cited

U.S. PATENT DOCUMENTS

| | | | |
|---|---|---|---|
| 1,944,283 | 1/1934 | Strecker | 179/1 CN |
| 3,399,275 | 8/1968 | Niertit et al. | 179/1 CN |
| 3,924,082 | 12/1975 | Oliver et al. | 179/18 BC |
| 4,109,111 | 8/1978 | Cook | 179/18 BC |

Primary Examiner—Thomas A. Robinson
Attorney, Agent, or Firm—Weingarten, Maxham & Schurgin

[57] ABSTRACT

A telephone conferencing system in which all input signals are twice applied to a circulating signal loop firstly in real time and secondly delayed by an interval equal to the delay of the circulating loop. The delayed signal cancels the first applied signal after circulation of the first applied signal to all other subscribers but before its return to the originating subscriber. The telephone conferencing system includes a network having a plurality of input/output line appearances which apply and receive signals to the network. The network consists of a signal circulating loop in which the signal circulates in a predetermined loop direction from line appearance to line appearance. At each line appearance signals are added to, received from, and deleted from the loop to provide a single circulation of each signal applied to the loop by each line appearance. Each signal beginning at the orginating line appearance thus circulates in the loop and is received by each of the other output line appearances until the signal has circulated around to the originating line appearance. There the signal is deleted from the loop ahead of the corresponding output line appearance by inserting to the loop an inverted version of the signal delayed by an interval equal to one loop circulation interval. The network loop may be implemented in analog or digital form. In the digital form shown the network is capable of establishing or terminating several mutually exclusive conference networks using separate loops linking different groups of input-/output line appearances. Additionally nonblocking network interconnections are shown for establishing conferences between line appearances associated with several different networks.

22 Claims, 9 Drawing Figures

CONFERENCING COMMUNICATIONS SYSTEM

FIELD OF THE INVENTION

The present invention relates to communications conferencing systems.

BACKGROUND OF THE INVENTION

In a telephone conference system, it is desirable to provide each conference participant or subscriber with the sum of all the signals in the conference excluding his/her own. One technique for accomplishing this result is to apply all signals to a multi-port bridge network, which is so structured that the signals at each port are prevented from returning to the corresponding port. This technique is limited in the number of signals that can be combined in conference before great complexity sets in, as shown in U.S. Pat. No. 1,944,283. Another technique involves sampling the various inputs, storing them, and then switching all but the appropriate input signals to the corresponding output. Such a system is shown in U.S. Pat. No. 3,924,082. In a further technique all the inputs are summed and returned to all the outputs where a corresponding input signal is subtracted from the summed signal. Such a system is shown in U.S. Pat. No. 3,399,275.

BRIEF SUMMARY OF THE INVENTION

In the conferencing system of the present invention, the input of each subscriber's line appearance is added to a signal circulating, closed loop. A delayed version of each of the input signals is subtracted from the circulating conference signal in the loop at a location (relative to the direction of signal flow in the loop) that is just ahead of the point at which that signal was previously added into the loop.

The delay imposed on the input signal is made equal to the delay experienced by an input signal in propagating around the loop. With delays arranged as specified, the segment of the circulating loop between the point of signal addition and delayed signal subtraction contains no component of the signal previously added, but such a signal component appears once in all other segments of the loop resulting from one circulation of the signal through the loop before it is substracted out. Each signal applied to the loop thus circulates only once thereby avoiding reverberation distortion that otherwise would result with continuous signal circulation. The output signal for each subscriber or line appearance is tapped off the circulating loop at the point in the segment between subtraction of the delayed signal and addition of the original signal. This output signal at each line appearance of the loop will contain components of all inputs to the conference loop except those inputs associated with that line appearance.

The loop delay may be apportioned in any manner amongst adders. subtractors or delays intermediate the line appearances in the loop but the sum of all these delays in the loop must equal the delay imposed on the input signal used for cancellation. Under these conditions each subscriber will hear all other subscribers in his receiver, except himself, regardless of the number of subscribers to a given conference.

The system may be implemented in analog or digital forms employing either a time-division multiplexed (TDM) or space division recirculating loop. Because of the availability of high-speed low-cost digital components a time-division digital implementation is preferred to reduce equipment complexity. In addition, TDM implementation can be conveniently integrated with conventional TDM circuit switching functions for further simplifications in a telephone switching system. The present invention also provides a control system for adding and deleting subscriber's line appearances to a circulating conferencing loop, for transferring an identified line from one in-progress conference loop to a second in-progress conference loop, for performing line-to-line circuit switching functions, for simultaneously controlling several independent circulating conference loops that are self contained within a single TDM group, and for controlling circulating conference loops that include participants associated with several different TDM groups.

DETAILED DESCRIPTION OF THE INVENTION

The present invention contemplates a call conferencing system having a circulating loop (analog or digital equivalent) of predetermined signal circulation delay to which all input signals to a conference are added. Each signal added to the conference loop experiences one complete circulation after which that signal is deleted from the loop directly ahead of the point at which that signal was previously injected. Each subscriber receives signals from the circulating loop at a point intermediate the point of insertion of his signal and deletion of that signal after circulation once through the loop.

Figure 1:
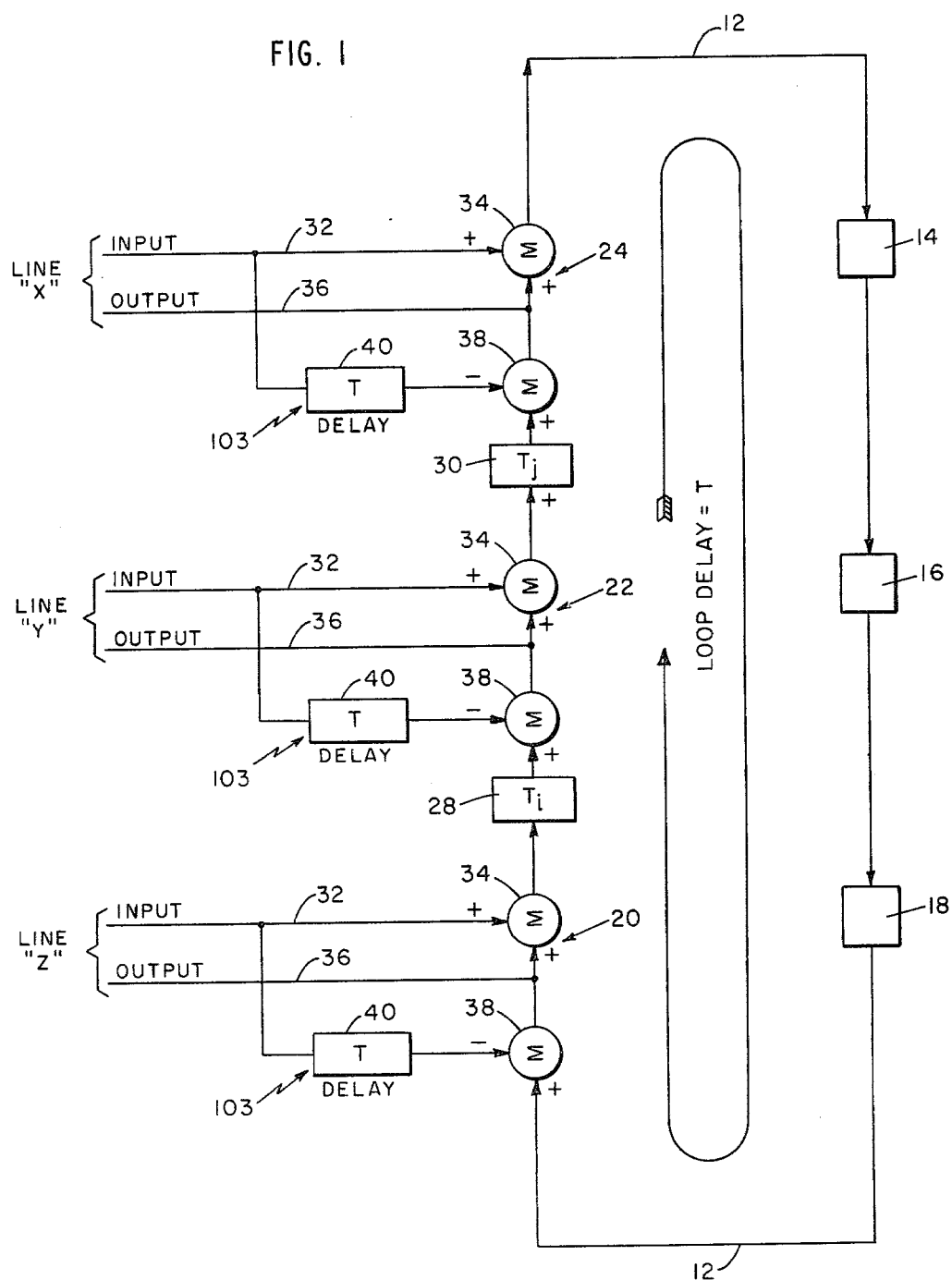
FIG. 1 is a block diagram of the conference loop arrangement of the present invention shown in analog form.

These features of the invention may best be understood in general terms by reference to FIG. 1 showing an analog circuit implementation of the conferencing system of the present invention. As shown in FIG. 1, a unidirectional signal path 12 is provided as a circulation loop linking a plurality of subscriber line appearances, 14, 16, 18, 20, 22 . . . 24 which comprise input/output pairs. The recirculating path 12 experiences a signal propagation delay $T_I$, $T_J$ etc. represented in the figure by delays 28 and 30 associated with each line appearance 14–24. Typically, in a space division conference circuit each of the delays 28, 30 etc. are of the same time interval but they need not be so. The total of all such delays for the loop 12 is a loop circulation delay, T, which is constant and predetermined for the particular loop, regardless of the number of subscribers that are actually connected to the available line appearances of the recirculating loop.

Each individual station at the line appearances 14–24 has associated with it a signal input line 32 over which signals generated by the subscriber are applied to the recirculating loop by means of one leg of an analog signal summer 34. The summer 34 has its second input leg connected into the signal path of the loop 12. The output of each summer 34 thus represents the sum of the signal circulating on the loop 12 at that particular point in combination with the just applied signal from the subscriber input line 32. The loop signal appearing on the second input leg of summer 34 is also fed to output line 36 for each station line appearance. Output line 36 typically connects to the subscriber's receiver. This signal represents the conference sum signal with respect to the input line 32 of the line appearance.

Each line appearance 14–24 also includes a further analog summing amplifier 38 which is inserted in the loop 12 and provides its output to the recirculating loop input to summer 34. The summing (positive) input of each summer 38 receives the circulating signal in the loop 12 from the summer 34 of the next prior line appearance 14–34 in accordance with the direction of signal flow. The summer 38 has a subtracting input applied to it from a delay circuit 40 which in turn receives the signal on the input line 32 of that corresponding line appearance. The delay time of each delay element 40 corresponds precisely to the total loop time T of the conference loop 12. In this manner each input signal arrives at the subtracting port of the corresponding summer at precisely the time that that signal arrives, after circulating once on the conference loop 12, at the summing input of that same summer 38. The output of the summer 38 will therefore contain no signal components deriving from signals appearing on line 32 of the same line appearance. The output of summer 38 will contain all signal components from any signals appearing on lines 32 of other line appearances, but only those that were applied during the prior interval T.

Figure 2:
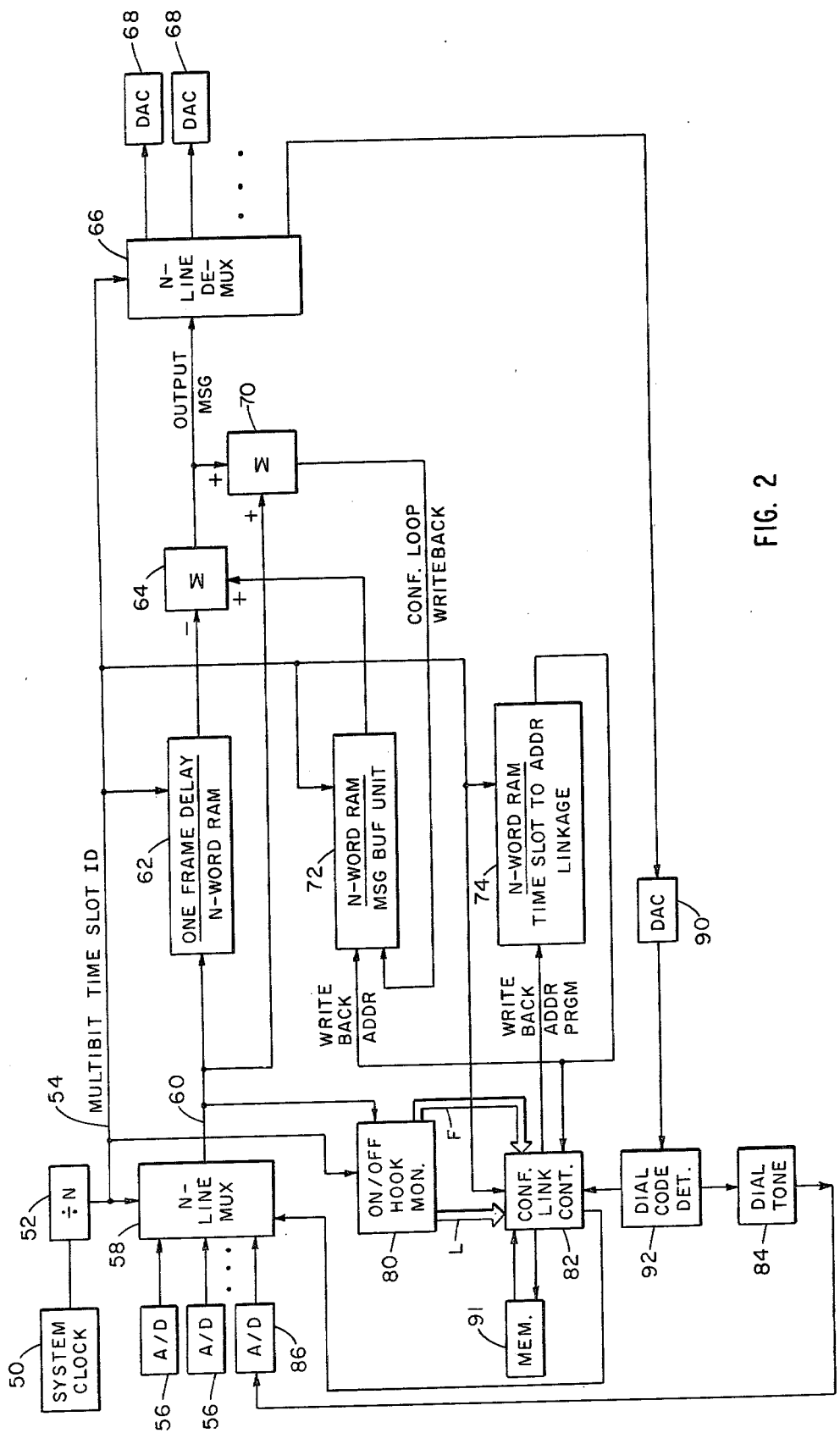
FIG. 2 is a block diagram showing a TDM digital embodiment of the invention and switching system for adding or deleting subscribers to conference loops.

With reference now to FIG. 2 and table I the structure and operation of a Time-Division Multiplexed version of the present invention employing digital arithmetic operations is illustrated. As shown in FIG. 2 a system clock 50 is provided having a bit stream output to a divide-by-N counter 52 which provides a multi-bit time slot identification output of parallel bits on a bus line 54. The digital words on the line 54 identify a repeating sequence of N time slots, corresponding to a TDM group of N line appearances. These digital words are applied throughout the digital circuitry to identify appropriate signal processing intervals corresponding to specific line appearances and to the input and output signals and to control variables associated with those identified line appearances.

Analog inputs from the various stations are applied through analog-to-digital converters 56 which convert voice or dial indicia into a corresponding digital representation. An N-input multiplexer 58 receives the digital representations from the various analog-to-digital converters 56 and steps through the digital signals applied from the converters under the control of the time slot signal on line 54. The multiplexer 58 thus provides a stream of data words on a line 60 representing in repeating sequence the digitized inputs from the N stations. This signal is applied to an N-word random access memory (RAM) 62 which provides a fixed delay of N clock periods to every input word. This delay corresponds to the period of a TDM frame as governed by the counter 52 and the multiplex switch 58. The RAM 62 therefore is the functional equivalent of the delay elements 40 in FIG. 1, but the one device creates the required delay for all N line appearances. This delay for purposes of the explanation is defined as one frame interval. The output of the one frame delay 62 is applied as a subtracting input to a digital summer 64. This one summer is the functional equivalent of all the summers 38 in FIG. 1. At each time slot position defined by counter 52 the output of the digital summer 64 defines the output message in digital form for that time slot. The output is distributed to the appropriate line by means of an N-line demultiplexer 66 which is controlled by the time slot signal appearing on bus 54. Each line appearance has a corresponding digital-to-analog converter 68, to convert the digital signal distributed by demultiplexer 66 back to analog form.

The output of the digital summer 64 is also applied to one input of a further digital summer 70. The other input to digital summer 70 is the input message on line 60 from the multiplexer 58. This one summer is the functional equivalent of all the summers 34 in FIG. 1. The output of summer 70, identified as a conference loop write back signal, is applied as an input to an N-word message buffer RAM 72 and stored therein at a "write" address location identified by a further N-word linkage RAM 74. Ram 74, Ram 62 and Ram 72 all receive "read" addresses from bus 54. Ram 62 also uses bus 54 as the write address thereby effecting an N word delay. Message buffer Ram 72 typically is provided with read and write addresses that are different in a given time slot, so that the delay through the buffer RAM 72 is different from the maximum value N. It is explained later how the particular numbers stored in linkage RAM 74 and applied as write addresses to message buffer RAM 72 effectively determine which of the TDM line appearances are combined together in conferences. The RAM 74, for each time slot identified to it, provides a write address control signal to the buffer RAM 72, identifying the memory address within which the write back signal from the summer 70 is to be stored. The combined conference signals from prior lines in said conference loop is located in RAM 72 at the address of the then current time slot. This value is read out of RAM 72 and applied to the signal cancelling summer 64 at that appropriate time slot.

The principle of operation of the two RAMS 72 and 74 with respect to establishing conference loops may be best understood by reference to table I which describes the actions performed at each affected time slot of a conference communication between stations and their line appearances identified as 1, 3 and 5.

Each time slot, such as 1, corresponds to a station, station 1, whose signals at that moment are received through multiplexer 58 and applied to line 60. Simultaneously that station receives conference signals destined to it via demultiplexer 66 and corresponding DAC 68. During the three time slots corresponding to stations 1, 3 and 5 the summers 64 and 70, provide an output message which is the sum of the digital word in the message buffer RAM 72 at the store location pointed to by the current time slot identification signal, minus the message from the corresponding station delayed by a complete frame interval in the delay unit 62. The write back message from the summer 70 is equal to the sum of the digital word in the message buffer RAM 72 at the same store location, plus the current input message from multiplexer 58 (i.e. the then present input message from the station corresponding in number to that time slot), minus the message of that same station from the prior frame.

As a result, and as shown above in table I, for the specified three party conference connection during time slot 1 the message buffer RAM 72 is reading out to summer 64 the contents of memory location corresponding to time slot 1 (hence station 1) and writing the write back message into the memory location corresponding to the time slot of the next station in the conference loop, in this case time slot or station 3. When time slot 3 next occurs, the contents of message buffer RAM 72 at the memory location corresponding to time slot 3 is applied to summer 64 while the write back message is being stored in the message buffer RAM 72 at the memory location corresponding to time slot 5, the slot corresponding to the next station in the conference. When time slot 5 next occurs the contents of the message buffer RAM 72 at the memory location for the time slot 5 is read to summer 64, and the write back message is stored at the memory location for time slot 1.

tion in RAM 72 in turn is readout, modified and written forward into the memory location that corresponds to the time slot of the next station in ascending numerical order in that conference. In this manner stations 2 and 4 could readily be added in a two party conference without interfering with the 3 party conference among stations 1, 3 and 5.

Table II shows the arrangement of reading and writing of messages in RAM 72 by which means nine stations are arranged in four conference loops. Stations 1, 7 and 8 form one conference loop; stations 4, 2 and 6 form a second conference loop; stations 9 and 5 form a third conference loop; and station 3 is on hook. Station 3 may be viewed as participating in a conference of one party as will be explained later. In table II the letter designations A,B,C correspond to the messages from stations 1, 2, 3 respectively and the subscripts denote in

TABLE I

MESSAGE BUFFER UNIT OPERATION
STATIONS 1, 3, 5
OUTPUT MESSAGE = CURRENT STORE - MESSAGE IN FROM PRIOR FRAME
WRITE BACK MESSAGE = CURRENT STORE + CURRENT MESSAGE IN - MESSAGE IN FROM PRIOR FRAME
STATIONS, TIME SLOTS, AND STORES ALL LABELLED CORRESPONDINGLY

| TIME SLOT | BUFFER UNIT OPERATIONS |
|---|---|
| 1 | READ OUT MESSAGE FROM STORE 1; WRITE WRITE BACK MESSAGE TO STORE 3 |
| 3 | READ OUT MESSAGE FROM STORE 3; WRITE WRITE BACK MESSAGE TO STORE 5 |
| 5 | READ OUT MESSAGE FROM STORE 5; WRITE WRITE BACK MESSAGE TO STORE 1 |
|   | OUTPUT MESSAGE |
| 1 | MOST RECENT INPUT FROM EACH STATION MINUS FRAME BEFORE MESSAGE FOR STATION 1 |
| 3 | MOST RECENT INPUT FROM EACH STATION MINUS FRAME BEFORE MESSAGE FOR STATION 3 |
| 5 | MOST RECENT INPUT FROM EACH STATION MINUS FRAME BEFORE MESSAGE FOR STATION 5 |

Thus the message buffer RAM 72 continues to accumulate the most recent messages originating at each station in the conference. Any such new message component remains in some memory location in message buffer RAM 72 for an interval that is precisely equal to one TDM frame, at which time the new message component appears simultaneously at the outputs of RAMS 72 and 62 and the output of summer 64 therefore contains no residue of that message. Thus the output message to each station contains all of the most current digital words corresponding to inputs from each of the conference stations minus the digital word corresponding to the most recent input from the receiving station.

Several separate conferences can be held simultaneously within the digital embodiment of FIG. 2 because, as will be shown below, the memory locations in message buffer RAM 72 that are occupied by any conference loop correspond directly to the time slots of each line appearance involved in the conference, and no others. In like manner memory addresses to direct the write back message into the appropriate locations in RAM 72 also occur in the time slots of the conferees. Any time slots not involved in one conference can be connected into a second, third or subsequent conference etc. In each such conference the contents of each locawhich frame that message was applied to the system. The memory locations in RAM 72 are labeled M1-M9 and the table indicates whether the indicated message is being written to or read from that location.

The system described thus far is capable of continuously operating on all time slots within the TDM frame to form any combination of time slots into conference loops. The conference linkages are completely defined by the address sequence appearing in the N word linkage RAM 74. To dynamically control the conference nets it is only necessary to modify the address sequence appearing in RAM 74 to either remove a time slot from a multi party conference, or to add an idle time slot to an existing conference. In the present system the on-hook state of a station, that is when it is communicating with nobody, establishes a conference loop of 1 station, that is a conference with itself. The creation or termination of conference links can thus be viewed as the addition or deletion of a party to a conference of size one or greater. It will be understood that a time slot can be moved from one conference loop to another by first removing it from its prior conference (forming a conference loop of one) and then adding it to the second conference loop. These functions are described in general below and in detail further along.

TABLE II

| | FIRST FRAME | | | | | | | | |
|---|---|---|---|---|---|---|---|---|---|
| (TIME SLOT ID) | 1 | 2 | 3 | 4 | 5 | 6 | 7 | 8 | 9 |
| (LINE 60 INPUT) | A1 | B1 | C1 | D1 | E1 | F1 | G1 | H1 | I1 |
| (ONE FRAME DELAYED INPUT) | 0 | 0 | 0 | 0 | 0 | 0 | 0 | 0 | 0 |
| (WRITE BACK MEMORY ADDRESS) | 7 | 4 | 3 | 6 | 9 | 2 | 8 | 1 | 5 |
| (BUFFER UNIT OUTPUT) | | | | B1 | | B1+D1 | A1 | A1+G1 | E1 |
| (WRITE BACK MESSAGE) | A1 | B1 | C1 | B1+D1 | E1 | F1+B1+D1 | A1+G1 | A1+G1+H1 | E1+I1 |
| M (OUTLET MESSAGE) | 0 | 0 | 0 | B1 | 0 | B1+D1 | A1 | A1+G1 | E1 |
| M1 CONTENTS READ | 0 | | | | | | | | |
| WRITE | | | | | | | | A1+G1+H1 | |
| M2 CONTENTS READ | | 0 | | | | | | | |
| WRITE | | | | | | B1+D1+F1 | | | |

TABLE II-continued

| | | | | | | | |
|---|---|---|---|---|---|---|---|
| M3 CONTENTS READ | 0 | | 0 | | | | |
| WRITE | | | C1 | | | | |
| M4 CONTENTS READ | 0 | | | B1 | | | |
| WRITE | | | B1 | | | | |
| M5 CONTENTS READ | 0 | | | | | | |
| WRITE | | | | | | | E1+I1 |
| M6 CONTENTS READ | 0 | | | | B1+D1 | | |
| WRITE | | | | B1+D1 | | | |
| M7 CONTENTS READ | | | | | | A1 | |
| WRITE | A1 | | | | | | |
| M8 CONTENTS READ | | | | | | | A1+G1 |
| WRITE | | | | | | A1+G1 | |
| M9 CONTENTS READ | | | | | | | E1 |
| WRITE | | | | | E1 | | |

SECOND FRAME

| | | | | | | | |
|---|---|---|---|---|---|---|---|
| (TIME SLOT ID) | 1 | 2 | 3 | 4 | 5 | 6 | 7 |
| (LINE 60 INPUT) | A1 | B2 | C2 | D2 | E2 | F2 | G2 |
| (ONE-FRAME DELAYED INPUT) | A1 | B1 | C1 | D1 | E1 | F1 | G1 |
| (WRITE BACK MEMORY ADDRESS) | 7 | 4 | 3 | 6 | 9 | 2 | 8 |
| (BUFFER UNIT OUTPUT) | A1+G1+H1 | B1+D1+F1 | C1 | B2+D1+F1 | E1+I1 | B2+D2+F1 | A2+G1+H1 |
| (WRITE BACK MESSAGE) | A2+G1+H1 | B2+D1+F1 | C2 | B2+D2+F1 | E2+I1 | B2+D2+F2 | |
| M (OUTLET MESSAGE) | G1=H1 | D1+F1 | 0 | B2+F1 | E1 | B2+D2 | A2+H1 |
| M1 CONTENTS READ | A1+G1+H1 | | | | | | |
| WRITE | | | | | | | |
| M2 CONTENTS READ | | B1+D1+F1 | | | | | |
| WRITE | | | | | | B2+D2+F2 | |
| M3 CONTENTS READ | | | C1 | | | | |
| WRITE | | | C2 | | | | |
| M4 CONTENTS READ | | | | B2+D1+F1 | | | |
| WRITE | | B2+D1+F1 | | | | | |
| M5 CONTENTS READ | | | | | | | |
| WRITE | | | | | E1 | | |
| M6 CONTENTS READ | | | | | | B2+D2+E1 | |
| WRITE | | | | | B2+D2+E1 | | |
| M7 CONTENTS READ | | | | | | | A2+G1+H1 |
| WRITE | A2+G1+H1 | | | | | | |
| M8 CONTENTS READ | | | | | | | |
| WRITE | | | | | | | A2+G2+H1 |
| M9 CONTENTS READ | | | | | | | |
| WRITE | | | | | E2+I1 | | |

For the purpose of changing stations in a conference, an on/off hook monitor 80, as shown in FIG. 2, is provided. The monitor 80 is operated in time slot synchronism from the signal on line 54, and also receives the output on line 60 from the N-line multiplexer 58. Monitor 80 provides an output signal to a conference link controller 82 indicating the off-hook (F0) or on-hook (F1) transitions corresponding to each time slot position of line 60 in accordance with each station's activity. As long as an on-hook or inactive station indication is provided from the monitor 80 to the controller 82, the controller 82 causes the linkage RAM 74 to provide a write back address to message RAM 72 during the station's time slot that corresponds to the stations own time slot number. As a result the output of the summer 70 is written back in message RAM 72 at the station's own time slot position and the message next appears at the output of RAM 72 one full frame later. This situation is illustrated in table II for station 3. In the scheme of FIG. 2 such a one party conference always produces a null signal at the output of adder 64, so that the message written back into message RAM 72 is the "one-hook" code sent by the station and appearing in digital form at the output of converter 68.

When an off-hook condition is detected by monitor 80, as indicated by the disappearance of the previous "on-hook" code, this change of state is applied to the conference link controller 82. The linkage RAM 74 is thereafter reprogrammed by controller 82 to establish a two party conference between the just off-hook station and the last line appearance in the N-line TDM frame. This last line appearance is connected to the signaling sender and receiver for controller 82 and the conference connection establishes a path connecting the sender and receiver of FIG. 2 to internal circuitry for dial tone reception and dial code keying at the just off-hook station. This off-hook station will receive a dial tone corresponding to the output of a dial tone generator 84 which is applied to the conference loop through an analog-to-digital converter 86 into the last or Nth input of the multiplexer 58. In this manner the output message to that station from demultiplexer 66 will include the digitized dial tone which after conversion to analog form in converter 68 is perceived as a conventional dial tone by the off-hook receiver.

The creation of an off-hook condition by one of the stations establishes a two party conference with the dial tone circuitry not only to provide a dial tone transmission signal back to the off-hook station but to provide a mechanism whereby dialed station indicia can be received by the conference link controller 82 and used to identify the station with which the dialing station is to be conferenced. For this purpose the last or Nth output of the demultiplexer 66 is applied through a digital-to-analog converter 90 into a dial digit detector 92 which responds to the first received dial digit to deactivate the dial tone generator 84. Dial digit detector 92 transfers dial numbers to the conference link controller 82 as they are decoded. When all dial numbers have been received by controller 82 the controller 82 interprets the dialed address as one of the time slot numbers, and expands the conference loop to include the designated time slot station according to the sequence described below.

As indicated above the conferencing system of FIG. 2 runs without intervention by controller 82 under conditions of established conference loops. These conference loops are defined by stored values in linkage RAM 74. Controller 82 is required only for purposes of changing the contents of linkage RAM 74 so that different conference arrangements can be created. As described above, the reception of dial numbers, interpretation of these numbers, assignment of dial receivers to off-hook stations etc. are necessary prerequisites to a conference telephone system with flexibility to adjust conference make up.

Figure 3:
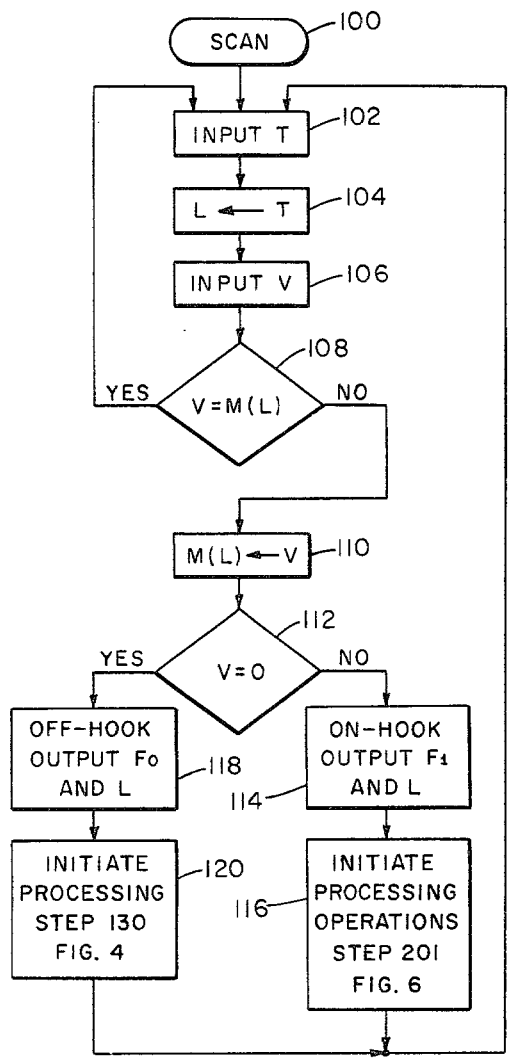
FIG. 3-6 and 9 are flow diagrams illustrating the functioning of specified components of the FIG. 2 embodiment.

With respect now to FIGS. 3-6 a set of processing algorithms are illustrated for the case of conference call expansion, initiation, deletion or termination. It should be noted that these algorithms illustrate the structure and operation of the conference link controller 82 and monitor 80 and may be readily implemented in hardware of descrete logic elements or through a programmed microprocessor having a read only memory organized to provide the indicated sequence of steps. FIG. 3 illustrates the sequencing of the on/off hook monitor 80 to detect the "on" or "off" hook condition of each station. From a scan state 100, such as a turn on condition, a first step 102 is a step which awaits the beginning of the next time slot. When this occurs the next step 104 stores the time slot number T (appearing on bus 54 in FIG. 2) into a memory location L. In next step 106 the input value on line 60 is compared with the "on hook" code word. If the patterns match, a line status variable in a register V is set to "one," otherwise V is set to zero. In succeeding step 108 a test is made of the value in register V, as stored in step 106, to detect whether it is the same as the value previously sampled on that line in the corresponding time slot of the previous frame. If the determination is that it is the same, no further action is required and processing loops back through step 102 whereas if a change has been detected processing proceeds to a step 110 in which the new V value is stored in a memory location of the line monitor 80 that corresponds to the stored time slot L. A subsequent test 112 detects whether the stored V value represents an on-hook to off-hook transition or the converse. Depending on this determination one or the other of the control bits $F_0$, $F_1$ are set on the pair of lines identified in FIG. 2 as "F" to line controller 82 in steps 114 or 118. Simultaneously, the time slot associated with that V value status change is identified by line monitor 80 to link controller 82 on a line identified as L in FIG. 2. If the line status V value is to "off-hook" an "off-hook" transition is detected, indicating that the bit change represents the first appearance of an off-hook as opposed to data flow status. This condition is communicated in step 118 by monitor 80 to controller 82 by a bit on one of the F lines. Simultaneously the identity of the station is detected by controller 82 from the time slot signal. Processing is then initiated according to the flow diagram in FIG. 4 as noted in step 120. In similar fashion a first appearance of an "on-hook" state causes processing to initiate according to the flow diagram of FIG. 6 as noted in step 116.

Figure 4:
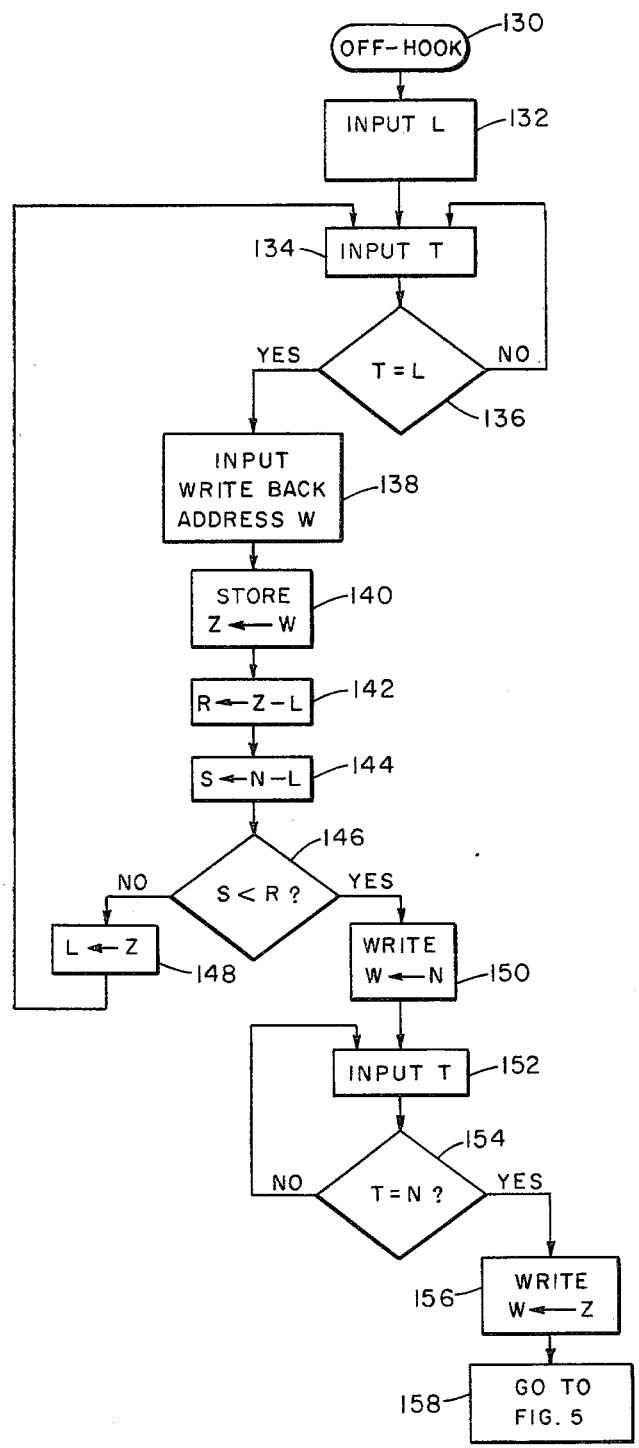

The processing of FIG. 4 represents the functioning of conference link controller 82 in establishing a conference call include the newly "off-hook" station and the dial circuitry comprising units 84, 90 and 92. From a start state 130 processing proceeds through a step 132 in which the identified dialing station line, $L_1$, is entered in a register as a result of the actions of the line monitor 80 described above. In a subsequent step 134, the time slot identification of the current time slot is recorded in a register and processing proceeds to a test step 136 which has a wait loop that effectively delays processing until the time slot identification T corresponds to the identification L of the off-hook station sensed in step 132. When the time slot and station indications coincide a further step 138 receives the write back address, W, from the linkage RAM 74 which is addressed at that time slot as more fully described below. This address is then stored internally in the linkage controller 82 in a location Z in step 140. Subsequent step 142 determines the numerical time-slot distance between that write back address and the line identification L as established by last occuring process step 132 (or 148 below). This value is stored in a register R. In a step 144 the numerical time-slot distance between the Nth time slot (corresponding in FIG. 2 to the line termination of dial code detector 92 and dial tone generation 84) and the time slot L is computed. A subsequent step 146 tests whether the numerical value obtained in step 142 exceeds the value obtained in step 144. If so, time slot N (the signaling line) will appear before the next scheduled time slot occurrence of the conference chain containing line L, and processing proceeds from step 150. This test is made to insure that merging line N into the existing conference chain will occur in a manner that results in the linkages in RAM 74 appearing in ascending order. In this way any input signal to the conference on one line will appear once and only once on each other line of the conference within a one frame interval, and the input signal will be cancelled at its own output line exactly one frame interval after its input. This is the necessary condition to achieve a fixed and invariable delay T in the conference loop. If the linkages were not organized in the prescribed manner more than one frame delay would occur through the conference loop 12 in FIG. 2 and adder 64 in FIG. 2 would not cancel the original input because of unequal signal delays of the input, and substantial unwanted side tones would be added to the circuit.

If the conditions of test 146 are not met, then in step 148 the register L is loaded with the contents of register Z. This is the current write back address (next line number in the conference in ascending numerical order). Processing then loops back through step 134 until step 146 determines that the then current time slot corresponds to the line number of the existing conference that is next below line N. When this condition for addition of the line L to the conference is satisfied in test 146 processing proceeds to a step 150 in which the new write back address N corresponding to the signaling line is written into linkage RAM 74 at a memory location corresponding to the current time slot. A subsequent step 152 reads the current time slot into the time slot register T and a subsequent test 154 determines whether that time slot is the same as the time slot corresponding to station N. When that condition is satisfied a step 156 writes into the linkage RAM 74 the new write back address for that time slot. The write back address is the value contained in the Z register which, in prior step 140, was set up to be the line address of the station in the existing conference that is next above N. Subsequently in step 158 processing proceeds to the algorithm indicated in FIG. 5.

Figure 5:
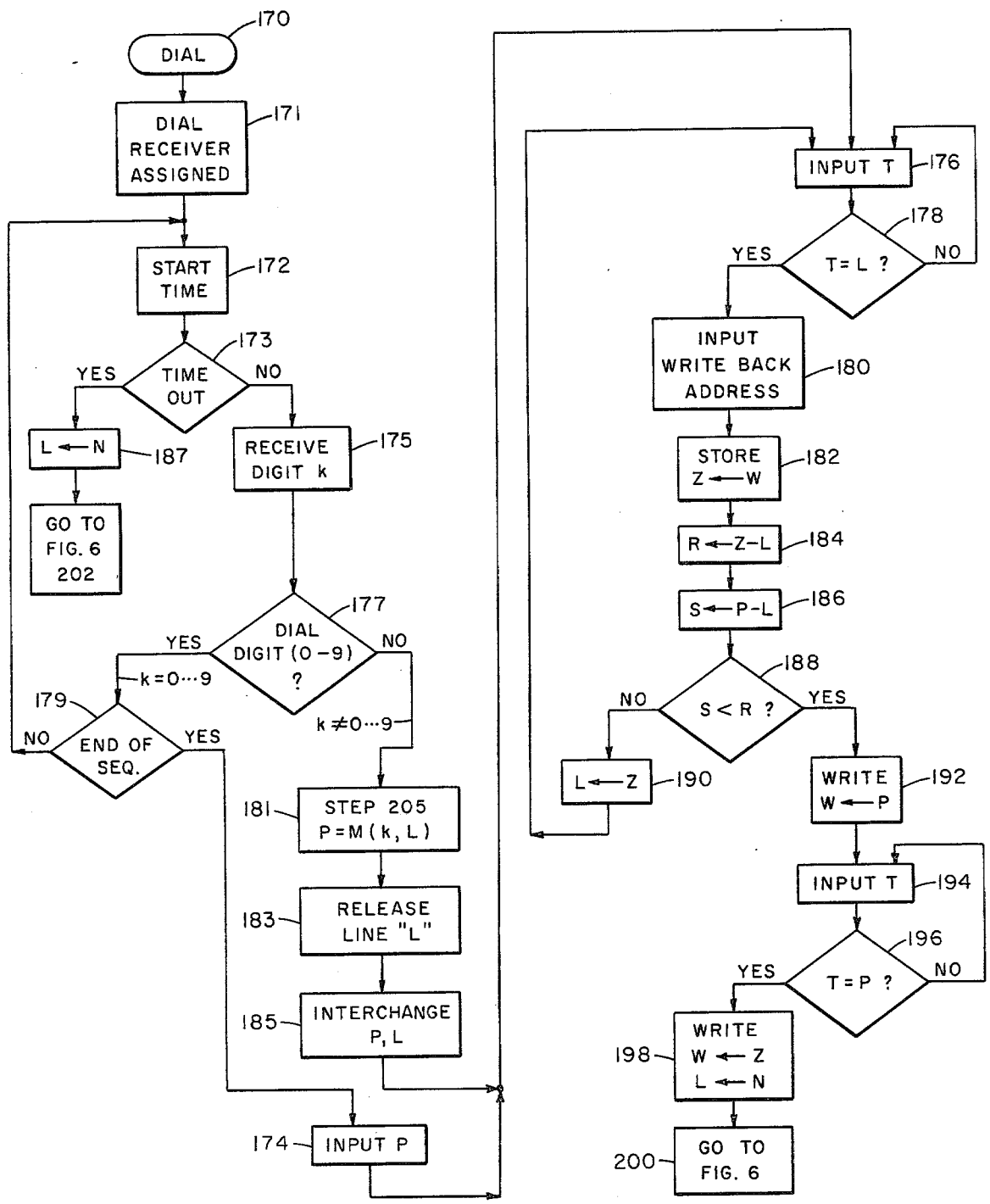

FIG. 5 represents the addition of a line, other than the dialing line N, to an existing conference and is therefore substantially similar to FIG. 4 processing in many respects. FIG. 5 provides for the addition of a specific line (identified to the controller by a conventional series of dialed digits) to the conference loop occupied by the dialing station. FIG. 5 also provides for the transfer of the dialing line to some other conference loop containing a station identified by the dialing station. This latter provision may be achieved by means of special call transfer keys on the telephone instrument as are known in the art. Typically the intention to add another line to an existing conference is signalled by a brief on-hook "flash" by one of the conferenced stations in order to execute the processing stops just described in FIG. 4 and obtain line connection to the dialing receiver. This flash interval is brief enough, as determined by a clock internal to monitor 80, as not to commence the termination sequence described later and shown in FIG. 6.

Accordingly, as shown in FIG. 5, from start step 170, entered from FIG. 4 step 158, sequencing proceeds to step 171 which denotes that the dial code detector 92 and tone generator 84 have been connected into a conference loop including the just off-hook line $L_1$ as initially set up in FIG. 4 processing. A subsequent step 172 commences a time interval that is used to limit dialing to a prescribed interval after which the dialing units of line N are released from conference with the just off-hook line $L_1$. A subsequent test step 173 checks whether the time out interval has been exceeded and if not sequencing proceeds to step 175 in which digits are received one at a time in the dial code detector 92. An affirmative result in test step 173 leads to a step 187 which places the Nth line identification in the L register for removal of that line from the conference net in the FIG. 6 processing. If in step 177, the received digits are found to be conventional numeric symbols 0–9, step 179 next detects whether all digits (i.e. the appropriate preselected number) have been received. If not, the processing loops back through steps 173, 175, 177 and 179.

If test step 177 detects other than a numeric symbol this test indicates actuation of a dialing station key that corresponds to a preselected other line whose existing conference net is to be expanded to include the dialing station. Processing from step 177 then proceeds to a step 181 which accesses from a memory 91 in FIG. 2 the identity of the line corresponding to this special symbol as both a function of the symbol and of the line or station originating the symbol. This identity then is stored in register P. A subsequent step 183 removes the dialing line L from the prior conference using a duplication of steps 204–230 described below in FIG. 6. At this point step 185 causes an interchange of the contents of the L and P registers, these registers thereafter containing the two parameters needed to merge the original dialing line into the existing conference identified by the special dialed symbol. From an affirmative result from test 179 processing goes to step 174 wherein the dialed address is stored in register P in controller 82, and registers P and L contain the two parameters needed to merge the dialed line P into the existing conference of the calling line L. Subsequently, from steps 174 or 185, processing proceeds to step 176 and thereafter to steps 178 and steps 180, 182, 184, 186, 188 and 190 that duplicate the steps 134–148 in FIG. 4 using instead of the argument N for the station to be acquired into the conference, the argument P for the station to be added. Once the processing of steps 176, 180, 182, 184, 186, 188 and 190 identifies the appropriate time slot of the existing conference net from which a link to new line P can be acheived in ascending line order, a step 192 writes address P into the linkage RAM 74 at that time slot location.

Subsequent step 194, test step 196 and step 198 repeat substantially the steps 152, 154 and 156 of FIG. 4 writing instead, the next succeeding station address into the write back register location of linkage RAM 74 for the time slot corresponding to the added station. Step 198 loads the line register "L" with the contents N. This duplicates the release function of step 183 and subsequent steps of FIG. 6. In this case the dialing equipment of line N is released from the conference net. Subsequently, step 200 returns to the scan state of FIG. 3.

Figure 6:
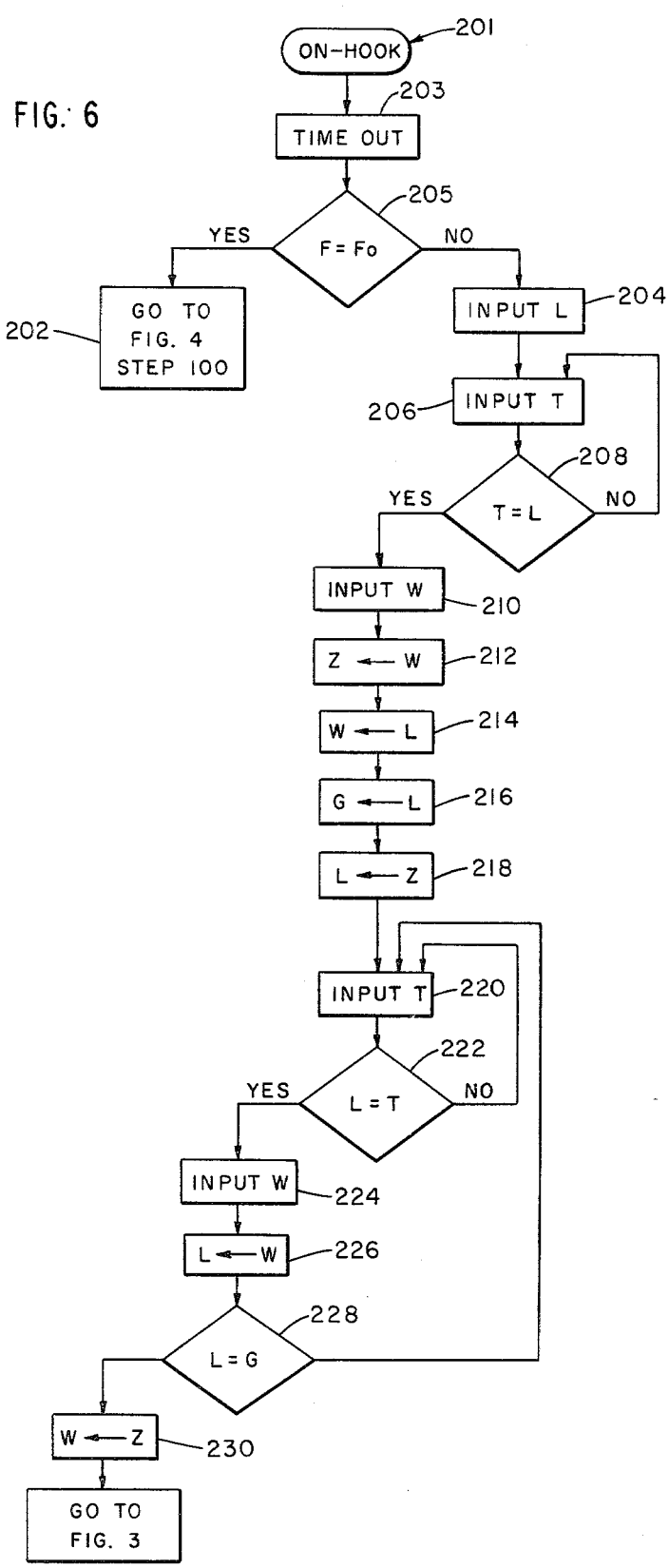

With regard now to FIG. 6 the processing steps executed by the conference link controller 82 for deleting a station from a conference are illustrated. It will be noted that in the FIG. 3 processing, FIG. 6 was entered under the condition of a status transition to the on-hook state as detected at step 112 and that as a result the entry to step 201 in FIG. 6 is accompanied by the identification L (of the station going on hook) to controller 82 along with the setting of a bit on line $F_1$ to identify the on hook condition.

Initially a series of steps 201, 203 and 205 are utilized to delay processing in step 205 from an intial on-hook detection in step 201 to distinguish between the permanent on-hook and a temporary on-hook "flash" used to dial a new station. After delay step 203 a test step 205 determines whether a transition back to off hook has been detected. If so, processing returns to FIG. 4 to conference the off hook line to the dialing receiver on line N. If not, processing proceeds to step 204 which registers in the controller 82 the value of the on-hook station L. Subsequent steps 206 and 208 cause a delay until the time slot corresponding to the on-hook station appears at which time step 210 reads the value of the write back address W at the time slot corresponding to station L and step 212 stores it in a Z register. A subsequent step 214 in the same time slot writes the L register code into the write back address for that time slot in linkage RAM 74. This forces the on-hook station L code in register to be linked with itself, the on-hook condition. A subsequent step 216 saves the line number of the dropped terminal by transferring the contents of the L register to the G register. The next step 218 replaces the dropped station line number in the L register by the write back address that formerly applied for the dropped station, that address identifying the next station in sequence in the chain of processing for the existing conference. A subsequent step 220 with a test step 222 causes a delay until the time slot code corresponds to the code for the next station line in the conference as identified by the contents of the L register. At this point the then current write back address is received by the controller 82 in a step 224 and this signal is applied to the L register of the controller 82 in a step 226. A subsequent test step 228 detects whether the original dropped station line number that was saved in the G register in step 216 corresponds to the write back address from the next succeeding conference station as applied to register L. Until this condition is satisfied test 228 loops back through step 220. Once satisfied, indicating that the time slot cycling has proceeded to the station line in the conference next preceding the dropped station, a step 230 places into the write back address for that next preceding station the write back address that was previously assigned to the dropped station and placed in the Z register in step 212. This effectively completes the deletion of the station line by forcing the write back address from the preceding station to point to the next succeeding station. Finally processing returns to the scan state of FIG. 3.

It should be noted that the processing in steps in FIGS. 4–6 may be conducted asynchronously with respect to the time slot counter 54 in FIG. 2, and the wait loop test steps such as steps 136, 154 in FIG. 4, steps 178, 196 in FIG. 5 steps 208, 222 in FIG. 6 provide the necessary bus synchronization for writing and reading and data from the high speed write back address bus from the linkage RAM 74.

Finally, conference link controller 80 provides a disable command line to multiplexer 58 which is activated during the processing of FIGS. 3–6 to avoid the generation of uncancelled transients in each conference loop at the start or termination of a station's inclusion in the loop.

One of the features of the invention discussed above, and in particular with respect to the structure of FIG. 2, is its ability to handle all possible combinations of desired calls without reaching saturation. All stations may thus be in conference at the same time in any combination of groupings, and the sequence of processing steps is no more lengthy for establishing any particular conference grouping than is required to connect all lines in normal two party connections as are provided with conventional telephone switching plants.

In addition, it can be seen from FIG. 2 that the number of stations, N, can be expanded in the TDM time slot arrangement with only a proportional increase in system memory size resulting from the required memory space of three words, one in each memory 62, 72, and 74 and proportional increase in system speed. At some point, however, the time slot rate (system clock frequency) becomes awkward and it is then prudent to employ a parallel combination of networks of the type illustrated in FIG. 2 together with mechanisms for inter-connecting them such that conferences can be formed between lines in different TDM groupings, for example a three party conference which includes a single station from each of three sets of TDM time slots.

Figure 7:
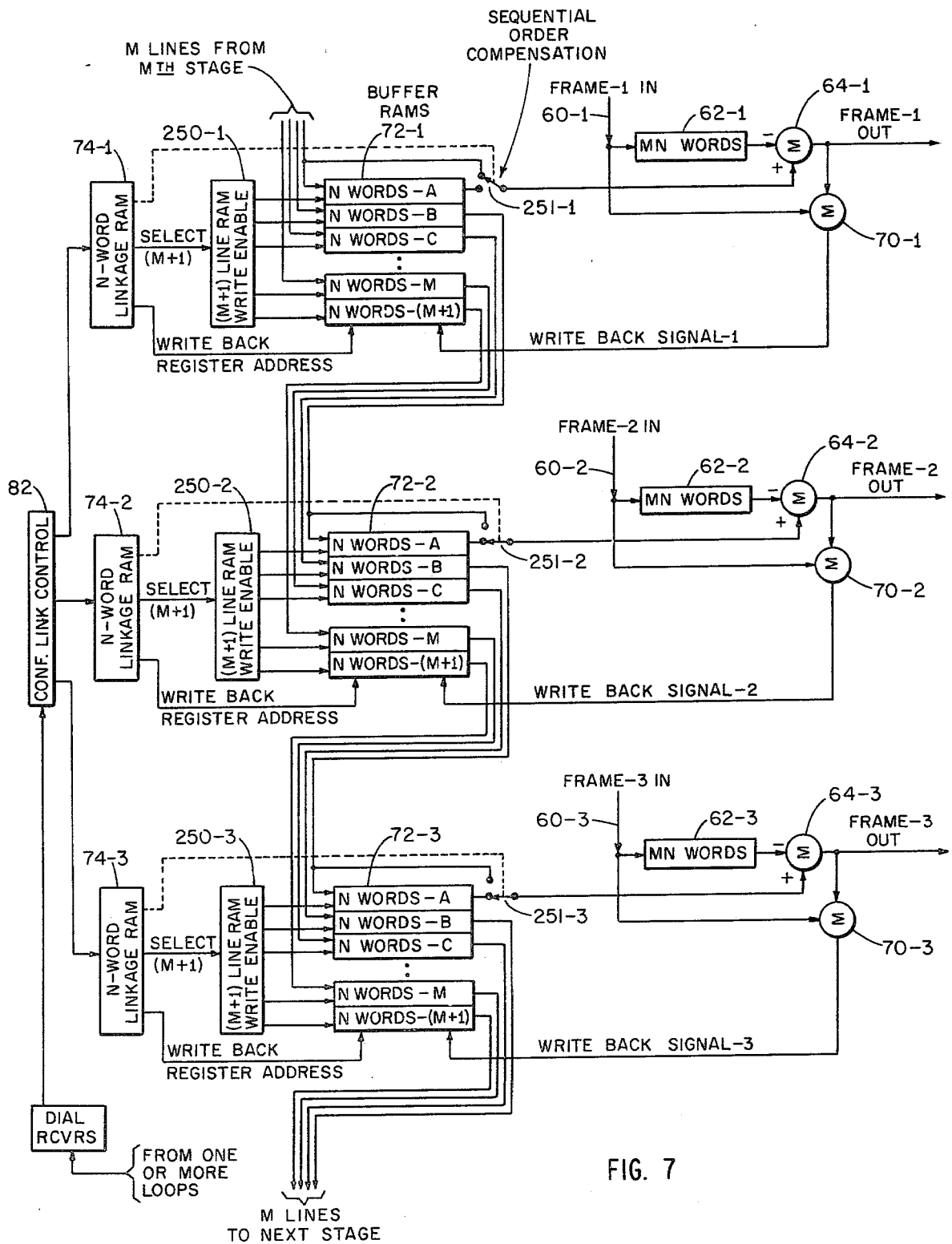
FIG. 7 is a block diagram of a system for conferencing between several conference circuits of the form according to FIG. 2.

FIG. 7 shows an arrangement whereby non blocking conference nets can be established in any combination among the time slots comprising M different TDM frames each having a system according to FIG. 2 that contains N time slots each. In FIG. 7, units are labeled with the number corresponding to the same unit in FIG. 2 with A-1,-2—M to designate the appropriate one of the M systems for each TDM frame. The operation of FIG. 2 components is the same as in FIG. 2 but on a frame level as opposed to a time slot level. The arrangement in the FIG. 7 is used in instances where the clock speed associated with the N time slots is already so great that further multiplexing of the frames into larger frames would be impractical.

The principle of operation for FIG. 7 is in accordance with FIG. 2 except that the delays applied to each input line 60-1-2 etc. and also the circulation delay through the entire conference loop are expanded and are all made identically equal to M TDM frame intervals, ie M×N time slots. According, delays 62-1 etc. are also M×M time slots. Each of the input TDM frames (1,2—M) on lines 60-1 etc. is applied to its own conference loop processor consisting of delays 62-1,-2, and summers 64-1,-2 and 70-1,-2 and the write back signal representing the accumulated sum of inputs to the particular conference net from summers 70-1,-2 is written into Buffer RAMs 72-1 etc. in accordance with the description for FIG. 2 at a location specified by linkage RAMs 74-1,-2 etc. In the system of FIG. 7 Buffer RAMs 72-1-2 etc. is composed by M+1 buffers of N words each denoted (A,B,C—M+1). Linkage RAMs 74-1,-2 etc. apply a write back address N and the adder 70 applies the write back signal to all of the buffer components 72-1,-2 etc., but only one of the Buffer RAMs 72-1,-2 etc. actually stores the signal at the address. This buffer RAM is selected by (M+1) line enable gates 250-1,-2 etc. in accordance with a linkage code word applied to gates 250-1,-2 from linkage RAMs 74-1,-2. In the cross connection scheme of FIG. 7 each of the N word Buffer RAMs 72-1,-2 etc. operates as a delay of one TDm frame interval for the cross connection paths, and a signal applied to the input of the M+1 level Buffer RAM 72-1 etc. of a particular conference loop processor experiences a delay of exactly M frame intervals before it appears at the input to the A level Buffer RAM 72-1 etc. of the same conference loop processor. The application of a signal to any level Buffer RAM 72-1 etc. other than the (A) or (M+1) level RAMs at the particular loop processor causes the signal to be applied for processing at another conference loop processor in accordance with the coupling scheme of FIG. 7. Selection of the proper level RAM 72-1 etc. is effected by RAM write enable units 250-1,2—M controlled by RAMs 74-1,-2—M. To effect conferencing of time slots within a single frame the write back signal is written into a location in the A level Buffer RAM 72-1 etc. in identical manner to that described in FIG. 2. After all time slots in a frame relating to a particular conference net are combined by the conference loop processor associated with the frame, the last write back signal in the frame associated with the particular conference net is applied to other than level A buffer RAM 72-1 etc. to cross connect the conference to the other frames. A conference net including time slots from one or several TDM frames can be established by applying appropriate enabling codes m and slot linkage addresses n to the N register locations in Linkage RAMs 74-1,-2 etc. Linkage RAMs 74-1,2 etc. function the same as RAM 74 in FIG. 2 but on a frame to frame level as opposed to a time slot level. In addition the Linkage RAMs 74-1,-2 etc. provides a control bit in each time slot for controlling the sequential order compensating switches 251-1-2 etc.

Figure 9:
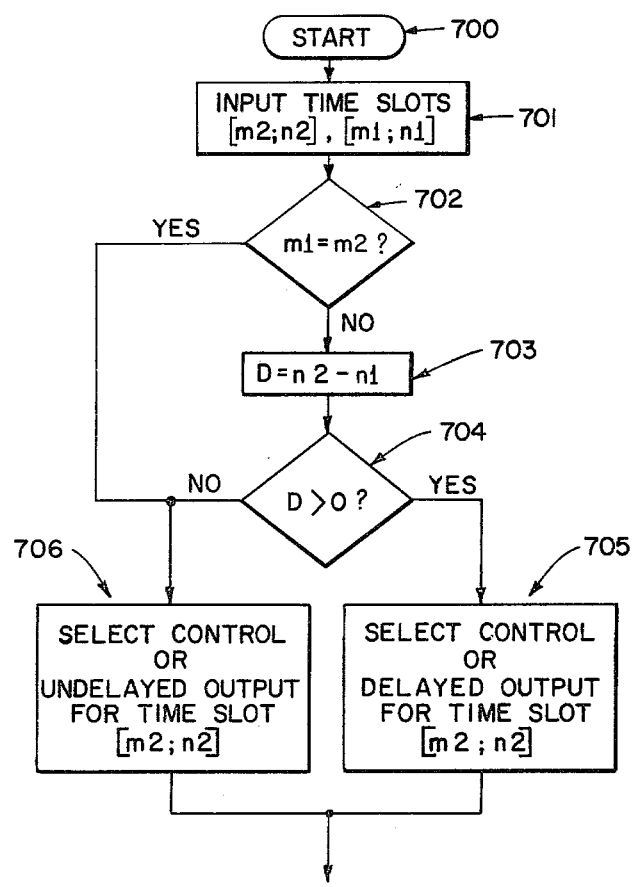

The linkage RAMs 74-1 etc. associated with a particular processor store one control bit for each of the N time slots of the TDM frame. This bit is applied to delay control switches 251 to select whether the input to each conference loop processor is to be delayed by one TDM frame interval or not as provided by the A level RAMs 72-1 etc. A linkage processor 82 computes the appropriate switch control bit for each time slot according to the algorithm of FIG. 9. In the first step 701 TDM frame addresses (the M×N field) of two time slots linked together in sequential order in a conference net are read into the processor 82. Step 702 tests frame numbers for a change in frame number. If the frames are different $m_1$ and $m_2$ are disregarded and the numerical difference of the TDM frame addresses is computed in step 703. In step 704 a determination is made as to whether the linked time slots are in ascending order with respect to reference time slot N. If so in step 705 the processor writes a one in appropriate linkage RAM 74-1 etc. of conference loop $m_2$ at storage location $n_2$. Otherwise in step 706 a zero is written into the same location of the RAM 74-1 etc.

Where companded PCM is used it should be recognized that converters 56 & 68 must include a transformation between companded and linearized signals for the conversion function.

The algorithms for establishing conference nets using the parallel processing arrangement of FIG. 7 are essentially the same as described earlier for FIGS. 3,4,5,6 except that the processing steps are defined over a field of MN time slots. The time slot address designation for time slots in different frames represents the time slot number (1-N)(within the frame) as least significant digits, and the frame number (1-M) as most significant digits. The algorithms of FIGS. 3,4,5,6 operate as before to conference and otherwise process the time slots in accordance with their sequential system address over the numbering field [M×N]. In the system of FIG. 7 expanded M×N addresses are written into the expanded linkage RAMs 74-1 etc. and the least significant digits representing time slot numbers $n \leq N$ are used as the common write back address to the Buffer RAMs 72-1 etc. and the most significant digits are used as the memory write enable code.

Figure 8:
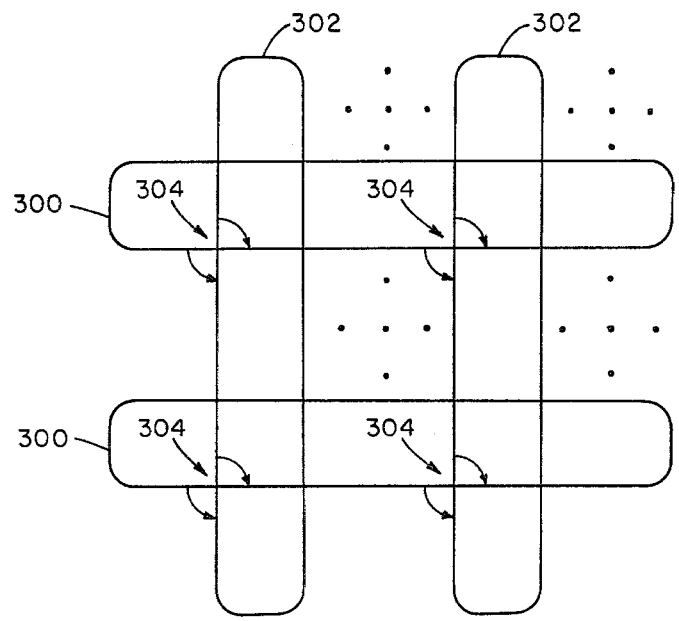
FIG. 8 is a further system for conferencing between several conference circuits of the form of FIG. 2.

A further system for combining conference loops is shown in FIG. 8 in which several conference loop processors of the form shown in FIG. 2 are cross coupled with other conference loop processors of the same form. Each of the loops contain their own linkage RAM 74, Buffer RAM 72, Delay RAM 62 and adders 64, 70 to sustain conference nets within the individual processors. Each of conference loops 300 and 302 may typically contain time slots corresponding to telephone terminals, but also include some line terminations 304 that are used to feed signals out of one conference loop 300 as inputs to another conference loop 302 and the reverse.

The principle of operation of the system in FIG. 8 can best be understood by observing that interconnects 304 represent a line termination for loop 300, and any signal applied to loop 300 from interconnect 304 will not appear on the output of interconnect 304 because of the conference loop cancellation within loop 300. Likewise no return from loop 302 will be seen if a signal is input to that loop from interconnect 304. However any signal injected by a conferenced line in loop 300 will be transferred through interconnect 304 to conferenced lines within loop 302, and the converse. Each loop in FIG. 8 separately provides means for sustaining internal conference nets in the same way as described for FIG. 2. Any internal conference nets in a loop 300 that also includes a coupling line appearance 304 will be expanded to include the internal conference net of loop 302 that contains the coupling line appearance 304. If the internal conference net of loop 302 also contains other coupling line appearances 304 that are also common to other loops 300 the original conference net is further expanded to include the internal conference nets containing all the coupling points 304 common to the internal conference net of loop 302.

What is claimed is:

1. A system for conferencing a plurality of stations comprising:
   a plurality of signal originating stations;
   a plurality of signal receiving stations;
   means for defining a predetermind time interval;
   means for identifying at least one of said signal originating stations and at least one of said signal receiving stations for communication each with the other;
   at least some of said signal originating stations and at least some of said signal receiving stations being identified as associated one with the other in conference communication;
   means for applying to each of the identified signal receiving stations a signal consisting of the combination of signals generated by each of the identified signal originating stations over a period of time defined by said time interval with signals originated by the signal originating station associated with that signal receiving station delayed said predetermined interval so as to cancel in the signals applied to each receiving station the signals originated by the associated originating station.

2. The conferencing system of claim 1 wherein said means for applying signals is operative to apply a combination of signals from identified signal originating stations in said time interval in exclusion of signals originated prior to said time interval.

3. The system of claim 1 wherein said applying means further includes:
   means for circulating signals in a closed loop having a loop circulation time corresponding to said predetermined time interval;
   means for combining signals from each of said identified signal originating stations to said signal circulating loop at distinct points thereon;
   means for applying signals from said loop to identified signal receiving stations; and
   means for deleting from said loop signals applied thereto by each identified signal originating station after circulation of such signal once through said loop.

4. The conference system of claim 3 wherein:
   said signal combining means includes a signal summing means for each signal originating station and having an input and an output in said loop and an input from each signal originating station; and
   said deleting means includes:
   means for delaying the signal from each signal originating station for said predetermined interval;
   a summer for each signal originating station and having an input and an output in said loop prior in the direction of signal flow to each associated summing means:
   the summer further having a second input receiving the delayed signal so as to cause cancellation of the signal component in said loop corresponding to the delayed signal;
   the signal applied to each said station receiving means being the signal appearing between each deleting means and associated combining means.

5. The conferencing system of claim 1 wherein said signal applying means includes:
   memory means for holding signals and having locations corresponding to each of the identified signal originating stations;
   means for storing in the storage locations of said memory means corresponding to identified signal originating stations signals composed of combinations of signals from identified signal originating stations over said time interval;

further means for applying to each identified signal receiving station the stored signal;

further means for excluding from the stored signal in application to each signal receiving station that signal from the corresponding signal-originating station.

6. The conferencing system of claim 5 wherein:

said storing means includes:

means for identifying a repeating pattern of time slots, one each corresponding to an identified signal originating station, the repeat interval corresponding to said predetermined time interval;

means for shifting signals sequentially through said memory means from one location corresponding to one said identified signal originating station to another location corresponding to another said identified signal originating station during time slots corresponding to said identified signal originating stations.

7. The conferencing system of claim 6 wherein:

said shifting means includes:

means for adding to each signal shifted from location to location a signal from the signal originating station corresponding to the location shifted from.

8. The conferencing system of claim 6 further including:

multiplexing means for selecting signals from each signal originating means in accordance with said repeating pattern of time slots for storing in said memory means;

demultiplexing means responsive to signals being shifted for deleting therefrom the signals delayed one predetermined interval and distributing such signals to the signal receiving stations in accordance with the repeating pattern of time slots.

9. The conference system of claim 1 wherein said identifying means includes means for changing the identification of signal originating and receiving stations.

10. The system of claim 9 wherein said means for changing includes means for deleting identified stations.

11. The system of claim 9 wherein said means for changing includes means for adding identified stations.

12. The conferencing system of claim 1 wherein:

one of said signal originating stations includes means for originating a dial tone signal; and said identifying means includes means for detecting an on/off-hook transition in a signal originating station and for applying said dial tone signal to that signal originating station.

13. The conferencing system of claim 12 wherein:

one of said signal receiving stations includes means for storing indicia that identify a station from a signal originating station.

14. The conferencing system of claim 13 further including means for changing the identified signal originating and receiving stations to include the station identified by said stored indicia.

15. A system comprising a plurality of conferencing systems of claim 1;

means for cross coupling between said plurality of systems whereby identified signal originating and receiving stations are contained in separate ones of said plurality of conferencing systems.

16. The system of claim 15 wherein said cross coupling means includes;

means for applying signals between signal originating and receiving stations respectively of different conferencing systems according to claim 1.

17. The system of claim 15 wherein;

the applying means of each conferencing system includes memory means having a storage location corresponding to each signal originating station and means are provided for shifting stored signals between memory means of the respective conferencing systems.

18. The system of claim 1 further including:

means associated with a signal originating station for further identifying one or more stations for inclusion in association in conference communication.

19. The system of claim 18 wherein said further identifying means includes:

means for identifying that signal originating station for inclusion in association in conference communication with the further identified one or more stations.

20. The system of claim 18 wherein said further identifying means includes:

means for identifying another of said stations for inclusion in association in conference communication with the station providing the further identification.

21. A system for conferencing communications between a plurality of stations comprising:

a plurality of signal originating stations and associated signal receiving stations;

a signal circulating loop having a predetermined loop delay for a complete circulation of a signal;

means for combining signals from each of said signal originating stations to said loop at a corresponding port;

means for applying from said circulating loop signals to each of said signal receiving stations at a selected port ahead in the direction of circulation of the port for application of signals from the corresponding signal originating station;

means for deleting from the signal applied to each signal receiving station that portion of the circulating signal corresponding to the signal applied to said circulating loop from the corresponding signal originating station.

22. The system of claim 21 wherein said deleting means includes:

means for delaying the signal applied to said port from each signal originating station, said delay corresponding to the loop circulation time;

means for inversely applying the delayed signal to said loop in advance of the application of the circulating signal to the corresponding message receiving station.

* * * * *